United States Patent [19]
Urban

[11] 3,988,624
[45] Oct. 26, 1976

[54] SELF-GAUGING SENSOR ASSEMBLY
[75] Inventor: John A. Urban, Livonia, Mich.
[73] Assignee: Eaton Corporation, Cleveland, Ohio
[22] Filed: Mar. 15, 1971
[21] Appl. No.: 124,301

[52] U.S. Cl. .............................................. 310/168
[51] Int. Cl.² ........................................ H02K 19/20
[58] Field of Search .............. 310/90, 168, 268, 67, 310/68, 42, 155, 169

[56] References Cited
UNITED STATES PATENTS

| 3,267,399 | 8/1966 | Spieker et al. ................... 310/168 X |
| 3,482,129 | 12/1969 | Riordan ............................ 310/90 X |
| 3,489,935 | 1/1970 | Hayes ............................... 310/90 X |
| 3,515,920 | 6/1970 | Jones ................................ 310/168 |
| 3,515,921 | 6/1970 | De Lange .......................... 310/168 |
| 3,626,226 | 12/1971 | Pauwels et al. .................... 310/168 |

Primary Examiner—R. Skudy
Attorney, Agent, or Firm—Teagno & Toddy

[57] ABSTRACT

An electromagnetic sensor assembly for use with a rotor to sense the velocity of a rotating body and wherein the electromagnetic sensor includes gauge means projecting from the sensor in an amount corresponding to the desired magnetic gap with the gauge means cooperating with the face of the rotor during assembly automatically to adjust the sensor to a final assembled position which establishes the precise gap irrespective of dimensional variations which may be present.

17 Claims, 4 Drawing Figures

*INVENTOR*
*JOHN A. URBAN*

BY *Yount and Tarolli*
ATTORNEYS

SELF-GAUGING SENSOR ASSEMBLY

This invention relates to a sensor assembly for sensing the speed of a rotating body and, more particularly, to a selfgauging assembly for an electromagnetic sensor for automatically establishing the precise air gap irrespective of dimensional variations in the environment in which the sensor is assembled.

Various types of sensing devices have been developed for use in sensing the velocity of a rotating body. One type of sensor which has been widely employed, and with which this invention is concerned, is an electromagnetic sensor which typically comprises an electromagnetic coil cooperating with a toothed wheel which rotates unitarily with the body whose velocity is to be sensed. As each tooth of the wheel passes the electromagnetic coil, a flux change induces a signal in the coil which is related to the frequency of the teeth passing the coil. As is well known, the strength of signals generated by an electromagnetic sensor of this type are strongly affected by the magnitude of the space or gap between the electromagnetic core and the teeth of the wheel or rotor.

One specific application in which electromagnetic sensors have been utilized is in anti-skid systems for automotive and truck vehicles. In these systems, the electromagnetic sensor generates a signal related to wheel velocity or wheel deceleration which signal is then utilized in a control circuit for controlling application of braking forces to the wheels. In such systems, it is highly important that the signal generated by the electromagnetic sensor be an accurate representation of the instantaneous wheel velocity so that an incipient skid condition can be detected and the proper corrections signaled within the system to correct the braking pressure. Since the quality of the signal generated by an electromagnetic sensor is, as noted above, dependent on the gap between the coil and the rotor, it readily follows that the gap must be precisely established and maintained within critical limits if the anti-skid system is to function properly.

When used in anti-skid systems, the electromagnetic sensors normally are associated with the wheel-axle assembly. The problem of establishing and maintaining the proper gap in assemblies of this type is particularly troublesome because of the dimensional variations which are normally permissible between the wheel, the axle and the related parts. Moreover, the sensor in many cases is inaccessible for adjustment once the assembly has been installed. Accordingly, to use electromagnetic sensors with such assemblies, it has been necessary to attempt to maintain close tolerances and-/or utilize elaborate mounting arrangements for the sensor together with precise assembly techniques to achieve the desired gap. The manufacturing and assembly limitations thus imposed on the use of electromagnetic sensors with wheel-axle assemblies has restricted their use in anti-skid systems notwithstanding their otherwise relatively simple and inexpensive construction.

It is the principal object of this invention to provide a self-gauging electromagnetic sensor assembly which automatically establishes the precise gap required for proper operation notwithstanding dimensional variations in the wheel-axis assembly on which the sensor is assembled.

Another object of the invention is to provide an electromagnetic coil assembly adapted to cooperate with a rotor and wherein the coil assembly includes self-gauging means for automatically establishing the desired magnetic gap upon assembly with a rotor.

It is a further object of this invention to provide a sensor assembly for generating a signal proportional to the velocity of a rotating body wherein the sensor assembly includes a rotor having uniformly spaced teeth thereon, electromagnetic coil means supported adjacent to the rotor and gauge means projecting toward the rotor with the gauge means cooperating with the coil means to define a controlled gap between the core and the rotor.

It is a more specific object of the invention to provide a sensor assembly of the described construction wherein the gauge means comprises gauging members carried by the electromagnetic coil assembly with the gauging members being engageable with the rotor to define the desired magnetic gap between the coil and the rotor.

Still another object of the invention is to provide a sensor assembly of the described construction wherein the sensor assembly is adjustably supported on a supporting bracket for movement toward and away from the rotor whereby the final assembly position of the coil is achieved simply by installing the rotor in the desired position with the abutting engagement between the gauge members and the rotor displacing the coil assembly to the properly adjusted position.

Still a further object of the invention is to provide a sensor assembly which when installed alleviates destructive contact and/or wear which might otherwise result from undesired engagement between the coil assembly and the rotor due to axle deflection as unusually severe road bumps are encountered in actual operation.

The foregoing objects and features, as well as others, will be more apparent upon a complete reading of the following description which, together with the attached drawings, discloses but a preferred form of the invention.

Referring now to the drawings wherein like reference numerals indicate like parts in the various views.

Figure 1:
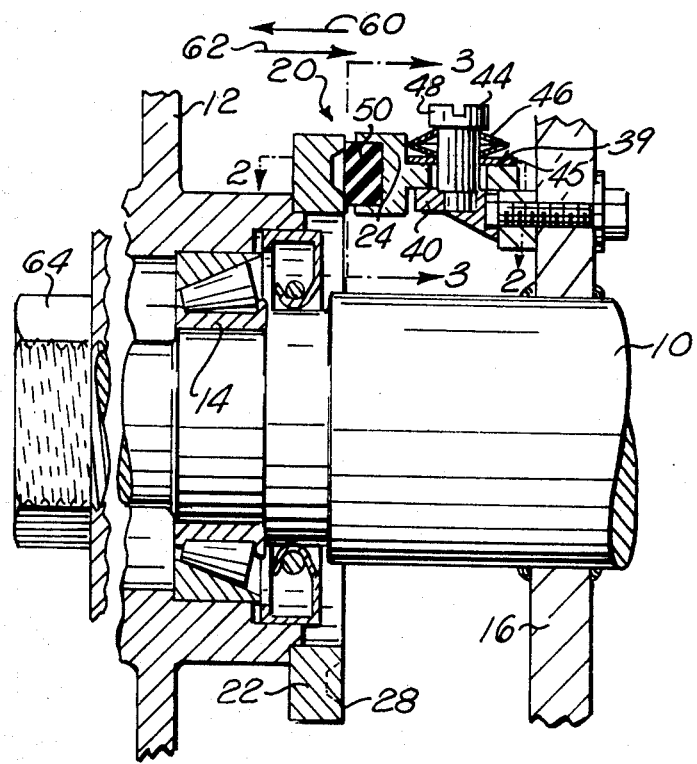
FIG. 1 is a longitudinal sectional view through a wheel-axle assembly and illustrates the assembled relationship of the rotor and coil assembly.
Figure 2:
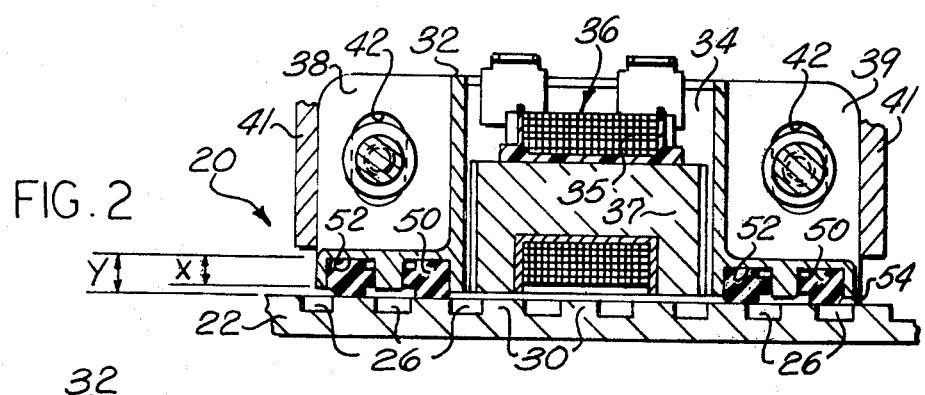
FIG. 2 is a sectional view along line 2—2 of FIG. 1.

Referring now more in detail to the drawings wherein the showings are for the purposes of illustrating a preferred embodiment only, the sensor assembly is illustrated as being incorporated in a wheel-axle assembly; however, it is to be understood that the principles of the invention may be used in any environment in which a sensor assembly is used for sensing the rotational velocity of a rotating body.

The wheel-axle assembly is illustrated as comprising a non-rotatable axle 10 on which a wheel 12 is rotationally supported by radial thrust bearings 14. A suitable and conventional brake mechanism, not shown, may be supported on a brake mounting flange 16 carried by the axle 10 with the brake mechanism being adapted to cooperate with the wheel hub 12 in conventional manner to brake the wheel as desired.

Cooperating with the wheel-axle assembly is the sensor assembly, indicated generally by the reference numeral 20. The sensor assembly 20 comprises a rotor 22 which is mounted on and secured for rotation with the wheel hub 12. Cooperating with the rotor 22 is an electromagnetic coil assembly or pickup 24 which is secured in a manner hereinafter to be described on the flange 16. As is apparent, upon operation of the vehicle, the rotor 22 rotates with wheel 12 relative to the coil assembly 24 and the axle 10.

The rotor 22 comprises an annular plate having a plurality of openings or recesses 26 formed in and equally spaced around one axial face 28 of the rotor. The spaced recesses 26 define therebetween a plurality of equally spaced lands or teeth 30.

The electromagnetic pickup coil assembly comprises a coil housing 32 which defines a central chamber 34 in which the electromagnetic coil 36 is positioned. As is conventional, the coil comprises the coil windings 35 and a core 37, the central portion of the core 37, i.e., the portion co-extensive with the coil 36, is preferably a permanent magnet which provides a magnetic field and is a source of the exciting flux for the sensor assembly 20. The housing 32 further includes a pair of arms 38,39 which are adapted to be supported by a bracket 40 carried by the flange 16. The bracket 40 has a pair of upstanding arms 41 which engage opposed sides of the housing 32. Each of the arms 38,39 has an elongated slot 42 formed therein. A shoulder screw 44 extends through each slot 42 and is threaded into a threaded hole in the underlying support surface of the bracket 40 with the shoulder of the screw abutting the upper surface of the bracket. A spring washer 46 is interposed between the head 48 of each of the screws 44 and a flat washer 45 resting on the upper surface of the support members 38,39. In this manner the screws 44 provide a controlled compression of the spring forces 46 which, in turn, provide a controlled biasing force biasing the arms 38,39 into supported engagement with the bracket 40. It will be apparent that the shoulder screws 44 cooperate with the slots 42 to locate the pickup coil housing 32 circumferentially of the rotor 22 and permit shifting movement of housing 32 axially of axle 10.

Figure 3:
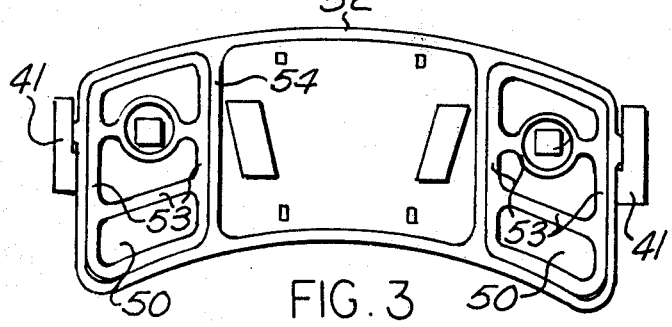
FIG. 3 is a sectional view along line 3—3 of FIG. 1.
Figure 4:
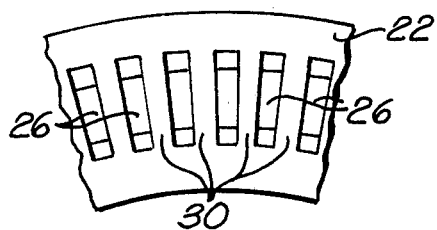
FIG. 4 is a fragmentary elevational view of the rotor.

To establish the proper gap between the axial end face 28 of the rotor 22 and the pickup coil 36, there is provided on the pickup coil housing 32 a pair of gauge members 50. Each gauge member, which may be a molded plastic, is positioned in an axially open recess 52 on either side of the coil 36. The configuration of the gauge members may vary but, as shown in FIG. 3, a plurality of ribs 53 project from the end face of the body of each member.

The gauge members 50 cooperate with the coil housing 32 and the coil 36 to establish the proper magnetic gap between the coil 36 and the rotor 22. More particularly, the axial end face 54 of the housing 32 is coextensive with the axially outer end of core 37 and comprises a reference plane which is parallel to the adjacent end face 28 of the rotor 22. By controlling the amount by which the gauge members 50 project beyond the end face 54 of housing 32, the desired magnetic gap between the rotor and the coil may be established simply by engaging the gauge members 50 with the axial end face of the rotor. Thus, the gap becomes a function of the difference between the depth of the recesses 52 and the thickness of the gauging members 50 and this relationship holds true so long as the end face 54, the axially inner surface of the recesses 52 and the front and back surfaces of the gauge members 50 are all flat and parallel to each other. The parallel nature of these surfaces may readily be controlled during manufacturing, and are wholly independent of the wheel and axle on which the sensor is to be assembled.

In installing the sensor assembly 20 on a wheel-axle assembly, the coil assembly would first be secured to the bracket 40 by the shoulder screws 44. In making this assembly, the pick-up coil housing 32 would be moved axially on the bracket 40 in the direction of arrow 60 until the shoulder screws 44 are engaged against the rearward end of the slotted openings 42 in the support surfaces 38,39. The shoulder screws 44 would then be tightened down to compress the spring washers 46. Thereafter, the wheel 12 carrying the bearing 14 and rotor 22 would be assembled axially over the end of the axle 10. The length of the slotted openings 42 is such that the coil assembly 24 extends axially of the axle 10 to a position where the rotor 22 will come into abutting engagement with the projecting ribs 53 on gauging members 50 before reaching a final assembled position. As the rotor 22 abuts the gauging members 50, further axial movement of the wheel 12 causes the sensor assembly 24 to be displaced axially in the direction of arrow 62 with the slotted openings 42 accommodating the sliding movement of the sensor assembly on the supporting bracket 40. When the wheel 12 reaches a final assembled position, the rotor 22 is still in engagement with the gauging members 50 thereby automatically establishing the proper gap between the end face 28 of the rotor and the pickup coil 36. The coil assembly is maintained in its final adjusted position by the continuing pressure due to the normal force exerted by spring washers 46 and the resulting frictional engagement of the washers 45 with the upper surfaces on arms 38,39 and the lower surfaces of arms 38,39 with the bracket 40.

It will be appreciated from the foregoing that the axial spacing or gap between the pickup coil and the rotor is a function of only the two dimensions and is independent of any axial dimensional variations which may arise between the wheel 12, bearing 14 and axle 10. Of course, the abutting engagement of rotor 22 with the ribs 53 of gauging members 50, which function as wear pads during initial operation, will result in some wear on the face of these members. However, since the ribs 53 provide a very small contact area, initial rotation of rotor 22 almost immediately establishes a running clearance between the rotor and the gauging members. This wear on the members 50 is very slight and any variation in the magnetic gap resulting from establishment of a running clearance between rotor 22 and these members is well within acceptable limits.

It is to be noted that once the described assembly has been completed, the wheel may be removed and subsequently re-assembled without any variation in the position of the coil assembly 24 and, hence, in the magnetic gap between the core and the rotor.

While the invention has been described with reference to a preferred embodiment, neither the illustrated embodiment nor the terminology employed in describing it is intended to be limiting; rather, it is intended to be limited only by the scope of the appended claims.

Having thus described the invention, what is claimed is:

1. A sensor assembly for generating signals in response to the rotation of a rotating body, said sensor assembly including
   a rotor rotatable with the body,
   stationary support braket means, sensor means supported on said support bracket means adjacent said rotor and cooperating with said rotor to define a gap therebetween, adjustable securing means for securing said sensor means on said bracket means;

said adjustable securing means permitting movement of said sensor means on said bracket means toward and away from said rotor, and gauging means on one of said sensor means and rotor and projecting toward and engagable with the other of said sensor means and rotor for limiting movement of said sensor means toward said rotor.

2. The sensor assembly of claim 1 wherein said gauging means project from said sensor means a distance substantially equal to the desired gap.

3. An electrical rotational speed sensor assembly for providing an electrical signal indicative of the rotational speed of a rotating wheel said sensor assembly comprising, a rotor supported for rotation with the wheel, stationary support bracket means, sensor means supported on said support bracket means adjacent to said rotor, gauging means engagable with said rotor and operative to space said sensor means a predetermined distance from said rotor to form a gap therebetween, and means for frictionally retaining said sensor means in an adjusted position on said bracket means.

4. A rotational speed sensor assembly for providing a signal indicative of the rotational speed of a rotating wheel, said assembly comprising, a rotor supported for rotation with the wheel about an axis of rotation, a support, pick-up means, means mounting said pick-up means on said support for movement toward and away from said rotor along a path generally parallel to said axis of rotation, and means for restraining movement of said pick-up means along said path.

5. A sensor assembly for generating signals in response to the rotation of a rotating body, said sensor assembly including a rotor rotatable with the body, stationary support bracket means, sensor means supported on said support bracket means adjacent said rotor and cooperating with said rotor to define a gap therebetween, adjustable securing means for securing said sensor means on said bracket means, said adjustable securing means permitting movement of said sensor means on said bracket means toward and away from said rotor, gauging means on one of said sensor means and rotor and projecting toward and engageable with the other of said sensor means and rotor for limiting movement of said sensor means toward said rotor, and said gauging means being supported on and projecting from said sensor means in a direction generally parallel to the axis of rotation of said rotor and said sensor means being movable on said support bracket means in the same general direction.

6. A sensor assembly for generating signals in response to the rotation of a rotating body, said sensor assembly including a rotor rotatable with the body, stationary support bracket means, sensor means supported on said support bracket means adjacent said rotor and cooperating with said rotor to define a gap therebetween, adjustable securing means for securing said sensor means on said bracket means, gauging means on one of said sensor means and rotor and projecting toward and engageable with the other of said sensor means and rotor for limiting movement of said sensor means toward said rotor, said adjustable securing means comprising means resiliently biasing said sensor means into supported engagement with said support bracket means, and means for applying a controlled compressive force to said biasing means whereby said sensor means is movable on said bracket means only when forces above a predetermined level are applied to said sensor means.

7. A sensor assembly for generating signals in response to the rotation of a rotating body, said sensor assembly including a rotor rotatable with the body, stationary support bracket means, sensor means supported on said support bracket means adjacent said rotor and cooperating with said rotor to define a gap therebetween, adjustable securing means for securing said sensor means on said bracket means, said adjustable securing means permitting movement of said sensor means on said bracket means toward and away from said rotor, gauging means on one of said sensor means and rotor and projecting toward and engageable with the other of said sensor means and rotor for limiting movement of said sensor means toward said rotor, said sensor means including a housing and said adjustable securing means comprises slotted opening means in said housing, fastener means extending through said opening means and secured to said support bracket means, and spring means operatively associated with said fastener means for exerting a biasing force against said housing to bias said housing into supported engagement with said support bracket means.

8. The sensor assembly of claim 7 wherein said housing includes recess means in which said gauging means are positioned, the depth of said recess means being less than the thickness of said gauging means whereby said gauging means extend outwardly of said recess means.

9. A rotational speed sensor assembly for providing a signal indicative of the rotational speed of a rotating wheel, said assembly comprising, a rotor supported for rotation with the wheel about an axis of rotation, a support, pickup means, means mounting said pickup means on said support for movement toward and away from said rotor along a path generally parallel to said axis of rotation, and means for restraining movement of said pickup means along said path, said means for restraining movement comprising resilient means acting on said pickup means.

10. The assembly of claim 9 wherein said resilient means exerts a force on said pick-up means in a direction normal to said path of movement.

11. The assembly of claim 9 and including means for controlling the magnitude of the forces exerted on said pick-up means whereby said pick-up means is movable on said support only when forces above a predetermined level are applied to said pick-up means.

12. A rotational speed sensor assembly for providing a signal indicative of the rotational speed of a rotating wheel, said assembly comprising
a rotor supported for rotation with the wheel about an axis of rotation,
a spindle supporting said wheel for rotation about said axis and said wheel being positioned on said spindle by axial movement of said wheel relative to said spindle,
pickup means,
means mounting said pickup means for movement along a path generally parallel to the axis of rotation of said wheel,
said rotor having means thereon which is sensed by said pickup means as said rotor rotates to generate signals in response to the rotation of said rotor past said pickup means, and
said means mounting said pickup means including means releasable to enable movement of said pickup means along a path generally parallel to the rotation of said wheel upon axial movement of the wheel onto said support.

13. A rotational speed sensor assembly as defined in claim 12 wherein said rotor has surface portions engageable with said pickup means to effect axial movement of said pickup means upon axial movement of said wheel and rotor onto said support, and
said pickup means has gauging means engageable with said rotor upon axial movement of said wheel and rotor and which determine the spacing between said pickup means and said rotor means.

14. A wheel speed sensor comprising:
a spindle;
a wheel hub rotatably mounted on said spindle;
disc brake means connected to said wheel hub and being rotatable therewith;
pickup means nonrotatably mounted on said spindle; and
a tone wheel connected to said hub and rotatable therewith, said tone wheel having notches on an accessible surface;
said pickup means being located in close proximity with said notches movable relative thereto to generate a signal representative of the rotational velocity of said tone wheel, and further comprising projections on said pickup means to locate said pickup means a predetermined distance from said tone wheel and to project said pickup means from damage due to normal vibrations.

15. The wheel speed sensor, as recited in claim 14, wherein said projections are located on opposite sides of said pickup means to accurately set said predetermined distance.

16. A wheel speed sensor comprising:
a spindle;
a wheel hub rotatably mounted on said spindle;
brake means connected to said wheel hub and being rotatable therewith;
pickup means nonrotatably mounted on said spindle; and
a tone wheel connected to said hub and rotatable therewith, said tone wheel having notches on an accessible surface;
said pickup means being located in close proximity with said notches movable relative thereto to generate a signal representative of the rotational velocity of said tone wheel, and further comprising projections on said pickup means to locate said pickup means a predetermined distance from said tone wheel and to protect said pickup means from damage due to normal vibrations.

17. The wheel speed sensor, as recited in claim 16, wherein said projections are located on the opposite sides of said pickup means to accurately set said predetermined distance.

* * * * *